United States Patent
Claseman (10) Patent No.: US 7,424,348 B2
(45) Date of Patent: Sep. 9, 2008

(54) SYSTEM AND METHOD FOR MONITORING SERIALLY-CONNECTED DEVICES

(75) Inventor: George Claseman, Campbell, CA (US)

(73) Assignee: Micrel, Incorporated, San Jose, CA (US)

( * ) Notice: Subject to any disclaimer, the term of this patent is extended or adjusted under 35 U.S.C. 154(b) by 683 days.

(21) Appl. No.: 10/879,818

(22) Filed: Jun. 28, 2004

(65) Prior Publication Data
US 2005/0288828 A1 Dec. 29, 2005

(51) Int. Cl.
*G06F 7/00* (2006.01)
(52) U.S. Cl. .......................................... 701/1
(58) Field of Classification Search ............... 701/1; 235/1 R; 711/109
See application file for complete search history.

(56) References Cited

U.S. PATENT DOCUMENTS

| | | | | |
|---|---|---|---|---|
| 5,168,463 A | * | 12/1992 | Ikeda et al. ................. | 365/78 |
| 5,497,380 A | * | 3/1996 | Bott et al. ................... | 714/735 |
| 6,415,394 B1 | * | 7/2002 | Fruehling et al. ............ | 714/30 |
| 6,421,795 B2 | * | 7/2002 | Yamashita ................... | 714/45 |
| 2002/0010882 A1 | * | 1/2002 | Yamashita ................... | 714/45 |

OTHER PUBLICATIONS

DeLurio et al., "Achieving Carrier Class Availability in Communications Equipment by Managing the Power Chain", Summit Microelectronics, Inc. White Paper, 2003, pp. 1-14, located at http://www.summitmicro.com/comp_info/paperP136ap, no date.

* cited by examiner

*Primary Examiner*—Yonel Beaulieu
(74) *Attorney, Agent, or Firm*—Dorsey & Whitney LLP (57) ABSTRACT

A monitoring system comprising a plurality of devices, each including a shift register and a status register. The plurality of shift registers are coupled in a serial chain. The monitoring engine is configured to receive status information from the shift registers and monitor status of the connected devices. The monitoring engine has the capability to monitor fault and persistence counts for analog and digital artifacts. A method for monitoring a plurality of devices coupled in a serial chain is provided.

34 Claims, 4 Drawing Sheets

SYSTEM AND METHOD FOR MONITORING SERIALLY-CONNECTED DEVICES

TECHNICAL FIELD

The present invention relates to a system and method for monitoring serially-connected devices, and more particularly, to a monitoring engine for receiving and evaluating status signals from serially-connected devices. The system may make control changes based on status received.

BACKGROUND OF THE INVENTION

Status information may be collected in electronic systems to provide a general health of the system or connected devices. The collection of status information is typically directed toward specific portions of the system, such as network connections, disk errors, bus parity errors, and other information related to faults or performance.

Analog variables such as voltage, current, and thermal characteristics may have independent reporting mechanisms from the fault or performance reporting mechanisms in typical systems, or such analog status information may not be collected.

There is therefore a need for a centralized mechanism to collect a variety of status information from connected devices and coordinate with higher level operating functions.

SUMMARY OF THE INVENTION

A monitoring system comprising a plurality of devices, each including a shift register and a status register, is provided. The plurality of shift registers are coupled in a serial chain. A monitoring engine is coupled to the serial chain and configured to send a status read signal to each of the plurality of devices such that status information is loaded from each of the status registers into the respective shift register. The monitoring engine is further configured to receive the status information from the shift registers. A method for monitoring a plurality of devices coupled in a serial chain is provided.

DETAILED DESCRIPTION OF PREFERRED EMBODIMENTS

Figure 1:
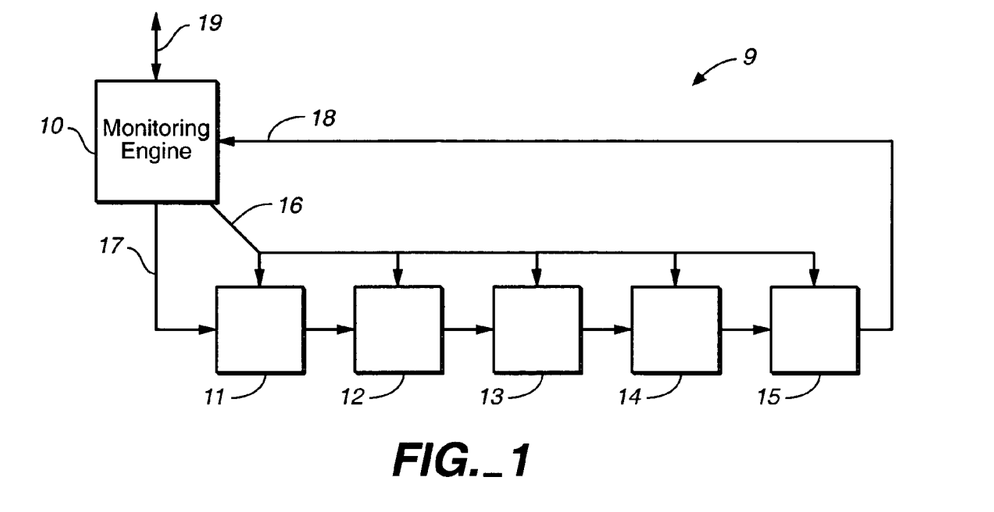
FIG. 1 is a schematic illustration of a system, including a monitoring engine, for monitoring serially-connected devices of the present invention.

An embodiment of a monitored system 9 according to the present invention is shown in FIG. 1. A monitoring engine 10 is coupled to a plurality of serially-chained devices 11, 12, 13, 14, and 15. The serially-chained devices 11-15 may generally be any type of device from which status information is desired, or to which control information is sent from the monitoring engine 10. Examples of serially-chained devices include power conversion devices. Power conversion devices convert an existing system power supply into another voltage level. Such a device may monitor voltage and current, or may represent a standby unit when redundancy is used. For some dedicated applications, a power conversion device may service another chip and be co-housed in the same package. In this manner, power requirements may be customized on a chip-by-chip basis allowing each chip to run at an optimum voltage. Examples of serially-chained devices may also include thermal management devices including thermal monitors and cooling control devices. By coordinating thermal related issues, the monitoring engine 10 may provide an optimal cooling profile based on present conditions. Further examples of serially-chained devices include event error monitors. Internal system events may be reported as single events to the event error monitors. These single events may be collected by the monitoring engine 10 into larger counts and may be associated with a persistence level (for example, errors per second), as described further below.

In some embodiments, some or all of the devices 11-15 are power devices, consuming power and sending status information regarding their power supply to the monitoring engine 10. There may generally be any number of serially-chained devices coupled to the monitoring engine 10—including 1, 2, 3, 4, 5, 6, 7, 8, 9, and 10 serially-chained devices. In other embodiments, greater than 10 serially-chained devices are coupled to the monitoring engine 10. Although not explicitly shown, the monitoring engine 10 may have more than one interface to the serial chain. In this manner, more than one chain may be serviced, or a redundant chain provided to the same chained devices, such as the devices 11-15.

The monitoring engine 10 couples or transmits a clock signal 16 to each of the devices 11-15. As described further below, the clock signal 16 may be a conventional clock signal or, in some embodiments, the clock signal 10 may be a multi-level clock signal such as described in U.S. application Ser. No. 10/850,126 filed 19 May 2004, the entire contents of which are incorporated herein by reference.

Status information 18 is coupled or transmitted from the plurality of devices 11-15 to the monitoring engine 10. The devices 11-15 communicate in a serial chain to the monitoring engine, such that, for example, status information from the device 11 is coupled or transmitted to the device 12, then to the device 13, then to the device 14, and finally to the device 15 before being communicated from the device 15 to the monitoring engine 10, as described further below. Status information generated by the device 15 is passed directly to the monitoring engine 10. Status information generated by the device 14 is coupled to the device 15 and then to the monitoring engine 10. During this process, as status is being shifted out, new control information may be shifted in. At the end of the transaction, new control information is in the shift register which gets sent to the local control registers within the devices 11-15. Variations of the transaction protocol allow for status read only, control write only, personality discovery, and individual element writing.

The status information 18 may include any of a variety of desired status information including a representation of analog information such as current, voltage, resistance, thermal characteristics and digital information, such as faults, errors, and the like. The status information may include a single event, a count of events having occurred since the last collection time, and/or a level as represented by a numerical value (for example, voltage, current, or temperature). For analog monitors, the value may represent a digital value of the present (or last measured) state. Additionally or alternatively, the status information may include a count value of a number of over and/or under-threshold events since the last status read. There may also be persistence monitoring that registers an event of persistence error (errors over time).

The monitoring engine 10 may also couple or transmit control signals 17 to the plurality of devices. As described further below, the control signals 17 are passed from device to device until reaching the intended device. For example, a control signal or message intended for the device 15 is first communicated from the monitoring engine 10 to the device 11, from the device 11 to the device 12, to the device 13, to the device 14, and finally reaching the device 15. The progression of status and control information through the devices 11-15 is controlled by the clock signal 16, such that, for example, in each clock cycle messages step from one device to the next. As the clock signal is broadcast to all the remote units 11-15 simultaneously. In some embodiments, the clock signal indicates what type of transaction is taking place. For example the clock may run continuously and change levels to indicate the beginning of a transaction and/or type of transaction. Data does not start passing along the serial chain until the transaction type has been determined, in some embodiments. In this manner, if status is being read, the last unit 15 determines at the start of the transaction cycle that a status read transaction is taking place and loads its status into the shift register.

The monitoring engine 10 may engage in any of a variety of transactions with the connected devices 11-15. Messaging may include reading status information and/or loading new control information, as described above. Discovery messages may also be sent, resulting in device information being received that may identify a type, kind, and/or number of devices connected to the monitoring engine 10. The monitoring engine may further issue diagnostic commands that may be used on a chip or board level. In some embodiments, further special commands or protocols may be issued by the monitoring engine to be used in the connected devices.

The monitoring engine 10 may further interact with other components of the system 9 through system signals 19. The system interface provides a mechanism to send events and receive bounding parameters from a more global level processing element. The system interface may be as simple as SPI or SMBus. The monitoring engine 10 may take action based on internal bounding parameters, and post a notification that a remedy has been applied. There may be different interrupt signals based on urgency of the matter. The monitoring engine 10 does not need to report anything under normal operating conditions or error levels not large enough to cause a fault level. The monitoring engine 10 is able to take corrective action when faults occur or are determined to be imminent.

Figure 2:
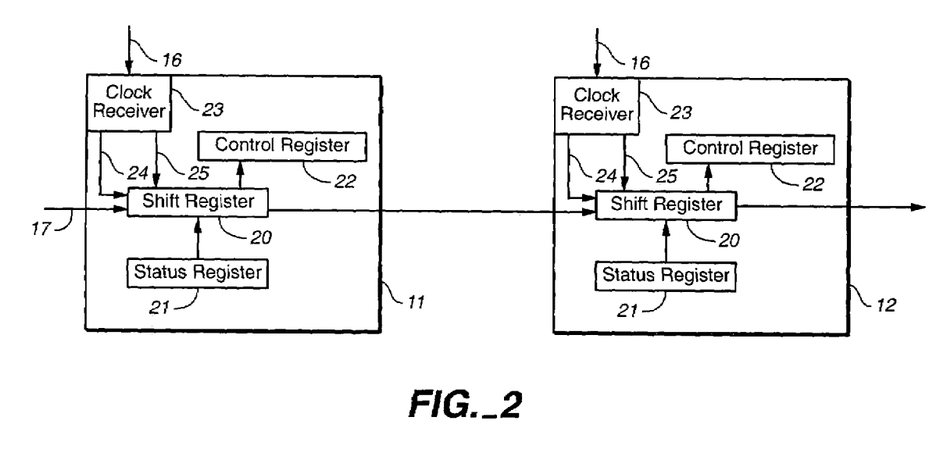
FIG. 2 is a block diagram of two serially-connected devices in the system of FIG. 1.

To facilitate the passing of status and/or control information to and from the monitoring engine 10, each of the plurality of devices includes a shift register 20 and a status register 21 and an optional control register 22 coupled to the shift register 20, as shown for example in FIG. 2 with respect to devices 11 and 12. Control registers are not required in devices or systems where, for example, only status information is to be collected, or where no control information is to be issued to the device form the monitoring engine 10. Accordingly, the devices 11-15 are coupled together at least by their shift registers 20. On receiving a status read indication from the monitoring engine 10, the status information is loaded from the status register 21 into the shift register 20. The status information is then propagated along the chain of serially-connected devices, as described above, until it is communicated with the monitoring engine 10. As the status information is propagated through the shift registers 20 of the devices 11-15, control information may enter the shift registers 20, such that, for example, in one clock cycle status information is passed from the device 15 to the monitoring engine 10 as each of the devices propagates their status information to the neighboring device and control information destined for the device 15 is coupled from the monitoring engine 10 to the shift register 20 of the device 11. Once the control information has been propagated down the chain, and the status information is collected, the control information is loaded from the shift register 20 to the control register 22 for execution by the device 11. Generally, status information from the devices 11-15 are all given a signal to load into the shift registers, on or after receipt of a status read indication from the monitoring engine 10. Likewise, at the end of the transaction, control information for the devices 11-15 may be loaded from the shift registers into the devices' respective control registers, on or after receipt of a control load indication from the monitoring engine 10.

Each of the devices 11-15 may include a clock receiving unit or clock receiver 23 coupled to shift register 20 for receiving the clock signal 16 from monitoring engine 10. In some embodiments, the clock signal 16 is a multi-level clock signal where the voltage level of the clock signal or a change in the voltage level of the clock signal is used to indicate a start, stop, or type of message being transmitted. Accordingly, in some embodiments the clock receiving unit 23 outputs a binary clock signal 24 and an indicator signal 25, where the indicator signal 25 indicates a start, stop, or type of message and is based on a voltage level or change in voltage level of the clock signal 16. For example, in one embodiment the indicator signal 25 may include a status read signal causing status information to be read from the status register into the shift register. The indicator signal 25 may also include a control load signal causing control information to be loaded from the shift register 20 to the control register 22. The shift registers, in one embodiment, have three modes. A first mode is a fixed mode, where no shifting is occurring. A second mode is a shift mode, and a third mode is a load mode. In load mode, information may be loaded from the status register or a personality of the chip may be loaded during a discovery process. Alternatively, other information, including alternate status information, may be loaded. The control register may have two modes—either retaining present values, or load from the shift register.

Figure 3:
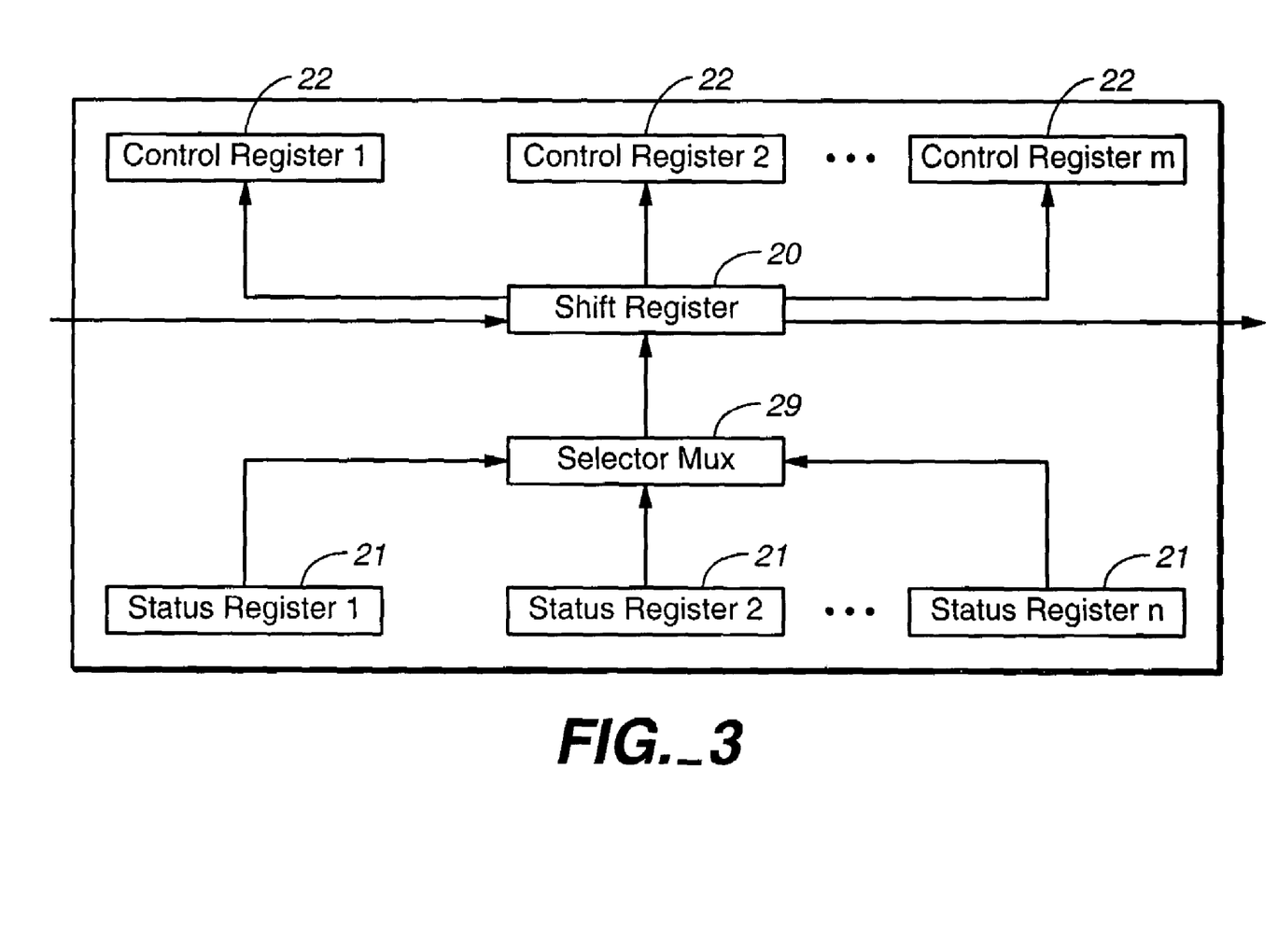
FIG. 3 is a block diagram of an embodiment of one of the serially-connected devices shown in FIG. 1 having a plurality of control and status registers.

Note that there may be more than one control register, and the shift register information may be loaded into one of many such registers. An embodiment of the device 11 having a plurality of status registers 21 and a plurality of control registers 22 is shown in FIG. 3. A selector multiplexor 29 is provided to select one of the plurality of status registers 21 for status information to be loaded into the shift register 20. In a further embodiment, selector bits may be provided in the front of the shift register 20 to select one of the plurality of control registers 22 to load into. In this embodiment, the control registers 22 may be sized to be equal to the shift register 20 size less the selector bits. Accordingly, a general control write may select specific control information to write in each of the serially-chaired devices. A 'no operation' code may be provided to select a 'no load' condition on a device-by-device basis. In an analogous manner, bits in one or more of the plurality of status registers 21 may indicate a status type—such as, for example, personality of the device, default status, emergency status, or other status. In some embodiments, the status type is specifically requested during a previous transaction cycle. In this manner, a designated number of bits in the status register represent the status indicator while others of the bits in the status register represent the status information or other content. Any size of the status indicator and status information may generally be used, according to the size of the status register provided.

Further, for status reads, status information selection may be loaded on a first transaction cycle, and status information from the selected status register read on a second transaction cycle. For example, a control message may be loaded into a control register where the control message indicates which status register to read from during a subsequent transaction cycle. The control message stored in the control register may indicate a sequence of status registers to read from during multiple transaction cycles. A default status register may also be designated to read from. Accordingly, a control message may also be provided for what read path to take after the selected status information is read —reverting back to a default path, for example.

Figure 4:
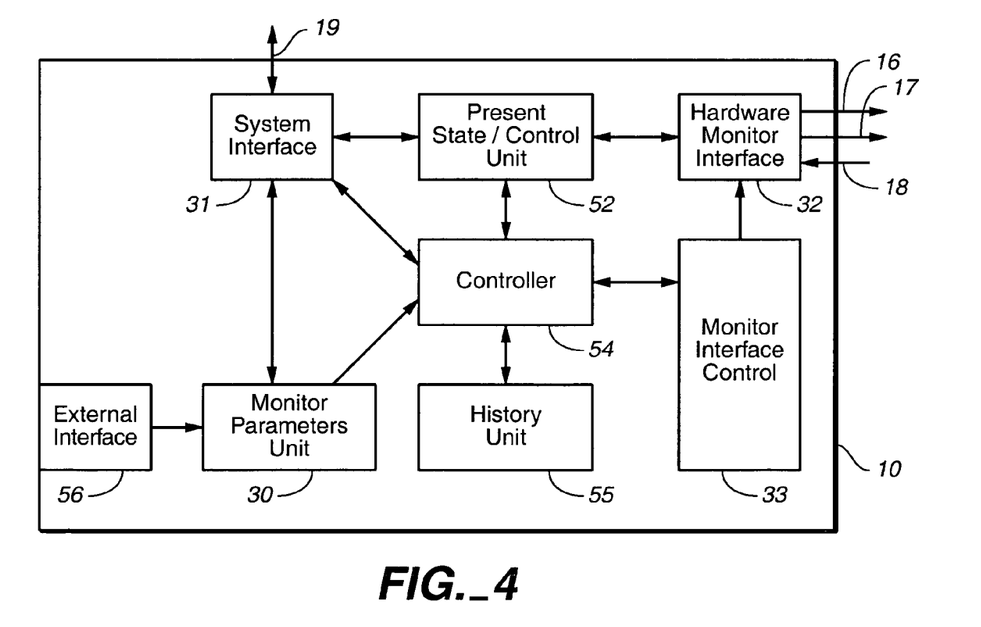
FIG. 4 is a block diagram of a monitoring engine of FIG. 1, according to an embodiment of the present invention.

The monitoring engine 10 may periodically collect information from connected devices. The monitoring engine 10 is configured to observe thresholds, external events, and persistence and take corrective actions if necessary. Accordingly, the monitoring engine 10 may contain initial state and/or bounding parameters stored in any suitable memory such as monitor parameters unit 30, as shown in FIG. 4. The initial state and/or bounding parameters may provide personalized initial settings for the monitoring engine 10, which may include parameters for initiating an alarm or other corrective action by the monitoring engine 10. In some embodiments, three levels of settings are provided in the monitoring parameters unit 30. A first level is a reset state of the device, providing a generalized configuration for operating the monitoring engine. A second level is programmed by an external storage element (for example, an EEPROM, flash, or other memory) through an external interface 56, that sets a static configuration for a particular installation. A third level is programming from a system interface 31 including custom profiles and dynamic capabilities. For example, the monitor parameters unit 30 may store a persistence value (such as a time value) that applies to one or more persistence monitors. Other personalized settings may include over and under thresholds for analog variables, upper limit, per-time period values for fault counts, time period of the fault counter, and notification controls (providing actions to perform when triggers occur). The monitor parameters unit 30 may indicate which monitors are active, bounding parameters for the monitored variables and control of actions and notifications.

The monitoring engine 10 preferably further includes a system interface 31 for interaction with other components of a system in which the monitoring engine resides (see FIG. 4). For example, the system interface 31 may allow a user, administrator, shell system, or other block in the system to dynamically control monitors as well as receive notifications from monitored events.

The monitoring engine 10 preferably includes, as illustrated in FIG. 4, a hardware monitor interface 32 for interacting with the serially-connected devices in communication with the monitoring engine 10. The hardware monitor interface 32 accordingly receives incoming signals which can include status or state information 18 and sends output signals which can include updated control signals or information 17, as well as clock signals 16, to connected devices. The monitoring engine 10 further preferably includes a monitor interface control unit 33 coupled to hardware monitor interface 32 to provide cycling control for the interface 32. The cycling control effects how often the status collection and/or control update occurs. The cycling control may indicate a number of clock cycles for a status collection and/or control update, defining a transaction cycle. The transaction cycle may be independent of the interface clock speed, or clock cycle.

provided for remote devices that may have no other clock source. A controller 54 is provided in monitoring engine 10 and preferably coupled to each of initial or monitor parameters unit 30, system interface 31, hardware monitor interface 32 and monitor interface control 33. While the controller 54 may not be directly coupled to the hardware monitor interface 32, the controller 54 may receive information from the hardware monitor interface 32 through the present control unit 52.

A present monitor state and/or control unit 52 may be coupled between the system interface 31 and the hardware monitor interface 32 and to controller 54 to contain an indication of the present state of variables or faults in the monitored devices, as well as present control information transmitted to the monitored devices. The monitoring engine 10 may have a history memory or unit 55 coupled to the controller 54 for storing monitor history, containing accumulated history for one or more monitors in relation to persistence or non-persistence of any monitored state. The history may include a collection of event postings that have historically occurred. In this manner, reporting of a single event may be combined with a historical event count of the monitored event. The monitoring engine 10 may accordingly take action or issue a control message based on an analysis of a present single event combined with analysis of historical occurrences of the event. Events may include faults, errors, or incidents of a variable exceeding a boundary level, for example.

The operation runs in a cyclic manner where the controller 54 waits for notification from the monitor interface control unit 33 that the transaction cycle is complete. At this point the controller 54 reads new information from the present state control unit 52 and combines this with the monitor history 55 if needed and compares with the bounding parameters stored in the parameters unit 30. If a fault level has not occurred, the monitor history unit 55 is updated to reflect the present state. The present control unit 52 may be updated as needed. For fault conditions, the control state in the present control unit 52 may be changed based on parameter actions and notifications from the monitor parameters unit 30. There may also be a notification posted to the System Interface 31. Any changes in control state would be executed on the next cycle as controlled by the monitor interface control unit 33. After the monitor interface control unit 51 completes the transaction cycle, the process may start again. This is an example of a single monitor, but there may be several monitors operating in the transaction cycle. In this regard, the transaction cycle may be tuned based on how many monitors are active, and how much time it takes to evaluate each monitor.

The monitor interface control unit 33 may also indicate a next transaction code to the hardware monitor interface 32. A general transaction cycle would be to read status from all connected devices and update control information in all connected devices. Other transactions may include reading from and/or writing to a selected one or more of the connected devices. Status information may be read from one or more devices and no control information written. In some instances, an adjustment of one of the connected devices 11-15 may be performed where a single write to the selected connected device is performed. This may occur during a monitor transaction cycle if immediate action is necessary.

The monitoring engine 10 may have any of a variety of thresholds that can trigger system notifications and/or actions to take place. In the case of a count of events, multiple events may have occurred since the last monitor transaction cycle. In the case of level-type events, a sample may be reported when the monitor transaction cycle occurs or it may represent a worst case capture since the last monitor transaction cycle. For example, a voltage, current, or temperature level may be reported at a predetermined time during a monitor transaction cycle. Alternatively, or in addition, the 'worst case', such as the highest or lowest, value of a variable that occurred during the monitor transaction cycle may be reported. The monitoring engine 10 may take level type of inputs and assign a reporting severity. The reporting severity may be tracked as a historical numerical count. In this manner, a graduated method may be applied to monitored elements.

In event and level monitors, the monitoring engine 10 may have a notion of persistence. If an event has ceased occurring, or occurrences are slowing, or a level monitor is outside of the lowest fault level for a certain time period, the history of the event may be cleared to observe a new series of events.

As can be seen, analog and/or digital artifacts may be monitored in a system that may typically not be monitored or would require processor bandwidth to evaluate. A central location is provided for the system to interface with monitored events. Corrective actions may take place as needed. Autonomous actions may be taken for portions of the system that have crossed a threshold or fault level. In some embodiments, one or more of the devices 11-15 connected to the monitoring engine 10 may monitor for errors and report those errors to the monitoring engine 10.

Generally the history unit 55 tracks history of the monitored elements. The history unit 55 is updated by the controller 54 based on present state values stored in the present control unit 52 and bounding parameters stored in the monitor parameters unit 30. The parameters stored in the monitor parameters unit 30 may be updated by the system through the system interface 31 once initial state is established. Generally, the monitor parameters unit 30 holding bounding parameters for various device types connected to the hardware monitor interface 32. When the monitor interface control unit 33 determines what device types are connected, it may establish the device sequence and assign default parameters from the monitor parameters unit 30 and monitors based on the device type bounding parameters. Initial state or status information may be coupled or transmitted to the monitor parameters unit 30 by the external interface 56. In one embodiment, the external interface 56 is an interface to an EEPROM (not shown). In other embodiments, other memory types may be coupled to the external interface 56 for setting initial state information. The external interface may also be a read/write devices, such as flash memory, that can store information as needed. The system signals 19 may be further operable to change or write bounding parameters in the monitor parameters unit 30 and to collect notifications from the monitor parameters unit 30. The system signals 19 may generally be carried over any suitable interface known in the art, including, for example, an SMBus. Communication from the system interface 31 to the monitor parameters unit 30 generally includes reading the present string of devices connected in the system 9, and modifying parameters as needed. Communication between the system interface 31 and the controller 54 includes notifications of monitor events and direct actions on any of the monitors as needed. In some embodiments, the system interface 31 is optionally connected to the present control unit 52, although in some cases communication between the interface 31 and the unit 52 is facilitated by the controller 54.

Figure 5:
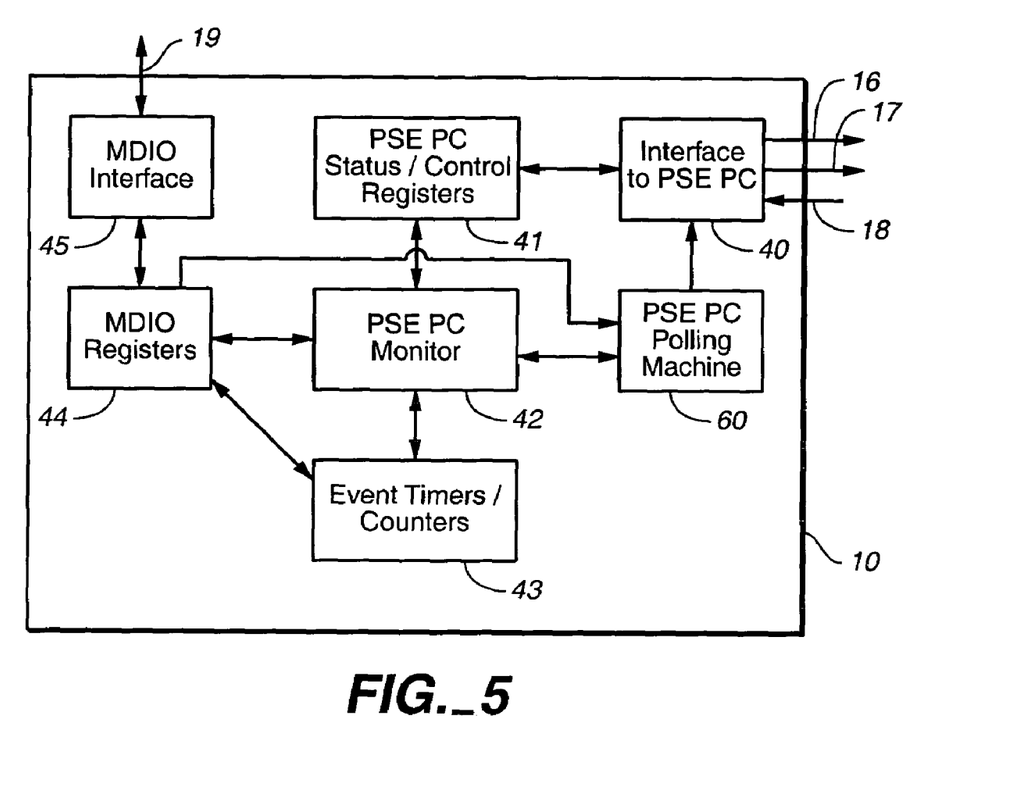
FIG. 5 is a block diagram of an embodiment of the monitoring engine of FIG. 1 for use in a power over Ethernet system.

Embodiments of a monitoring engine 10 may be used in a Power over Ethernet system, as shown in FIG. 5. The embodiment of the monitoring engine 10 shown in FIG. 5 is a physical layer system configured to communicate with a power sourcing equipment power controller (PSE PC) through a PSE PC interface 40. Accordingly, a PSE PC monitor 42 may be coupled to PSE PC status/control registers 41, MDIO registers 44, and event timers/counters 43. The MDIO registers 44 are further coupled to an MDIO interface 45 and a PSE-PC polling machine 60. The PSE-PC polling machine 60 communicates with the interface to PSE PC 40. The interface 40 is further coupled to the PSE PC status and control registers 41.

In the operation of the monitoring engine 10 of FIG. 5, status information is loaded from the interface 40, and optional control information written to the interface 40 using PSE PC status and optional control registers 41. The status information or state is read and control information updated using a PSE PC monitor 42. Event information is updated and/or read from event timers and/or counters 43. Information from the PSE PC monitor 42 accordingly contains present state or monitored information, while information from the event timers/counters 43 may further include historical information. The PSE PC monitor 42 and the event timers/counters 43 are coupled to MDIO registers 44 for communication with an MDIO interface 45. The MDIO interface 45 communicates with a system using an MDIO bus, as known in the art.

Generally, the components depicted in FIG. 5 provide the functionality for a Power over Ethernet system of the general components described above with reference to FIG. 4. The MDIO interface 45 provides the functionality of the system interface 31. The MDIO registers 44 provide the functionality of the monitor parameters unit 30. The event timers or counters 43 provide the functionality of the history unit 55. The PSEPC monitor 42 provides the functionality of the controller 54. The PSEPC status/control registers 41 provide the functionality of the present control/state unit 52. The PSE-PC polling machine 60 provides the functionality of the monitor interface control unit 33. The interface to PSEPC 40 provides the functionality of the hardware monitor interface 32. In the Power over Ethernet system shown in FIG. 5, initial parameters are generally supplied through the MDIO interface 45. In some Power over Ethernet systems, other external interfaces may be provided.

In embodiments of the present invention, the monitoring engine 10 monitors power supplies and/or power consumption of connected devices 11-15. In this manner, power management may be applied to devices having a limited power source—including for example, batteries, remote power, and/or solar power. Accordingly, embodiments of monitoring engines according to the present invention may limit or shut down power for capacity-limited devices. For example, in one embodiment a power device 11 is connected to a monitoring engine 10. The power device exhibits a thermal overage that recurs over a period of time. The monitor detects that a thermal variable exceeds a threshold, and a historical unit in the monitoring engine indicates that the thermal variable has repeatedly exceeded the threshold over a time period. Accordingly, the monitoring engine 10 sends a notification to other components (not shown) of system 9 regarding the thermal overage. The system sends a control signal 19 to the monitoring engine causing the monitoring engine to issue a control signal 17 to the power device 11 to shut down and/or limit a power supplying circuit. The monitoring engine may further send a notification 19 to the system regarding the power loss. In some embodiments, the monitoring engine may further initiate a backup power device 12 to replace the device 11 experiencing a thermal overage.

The monitoring engine 10 may be implemented as a stand-alone unit, chip, or plurality of chips, or may be integrated with other products and devices. Embodiments of monitoring engines according to the present invention may further be linked to devices using wired and/or wireless networks to provide remote power management. Accordingly, the system interface 31 may be a wireless link.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A monitoring system comprising:
   a plurality of devices, each including a shift register and a status register;
   the plurality of shift registers being coupled in a serial chain;
   a monitoring engine coupled to the serial chain and configured to send a status read signal to each of the plurality of devices such that status information is loaded from each of the status registers into the respective shift register, the monitoring engine being further configured to receive the status information from the shift registers.

2. A monitoring system according to claim 1, wherein each of the plurality of devices includes a plurality of shift registers.

3. A monitoring system according to claim 2, wherein at least one of the plurality of devices further includes a control register operable to specify at least one of the plurality of status registers such that status information is loaded from the specified status register into the shift register responsive to the status read signal.

4. A monitoring system according to claim 1, wherein at least one of the plurality of devices is a power device.

5. A monitoring system according to claim 1, wherein the status information includes a current or voltage level.

6. A monitoring system according to claim 1, wherein the status information includes a thermal indicator.

7. A monitoring system according to claim 1, wherein the status information includes a fault count.

8. A monitoring system according to claim 1, wherein the status information includes a persistence count.

9. A monitoring system according to claim 1, wherein each of the plurality of devices includes a control register and wherein the monitoring engine is configured to transmit control information to each of the shift registers and to send a load control signal to each of the plurality of devices such that the control information is loaded from each of the shift registers into the respective control register.

10. A monitoring system according to claim 9, wherein each of the plurality of devices includes a plurality of control registers.

11. A monitoring system according to claim 10, wherein the monitoring engine is further operable to transmit a control register indicator to the plurality of devices, the control register indicator specifying at least one of the plurality of control registers such that the control information is loaded into the specified control register.

12. A monitoring system according to claim 8, wherein the control information includes bounding information.

13. A monitoring system according to claim 12, wherein the bounding information includes a high or low threshold.

14. A monitoring system according to claim 8, wherein the monitoring engine is configured to transmit a clock signal having the load control signal to each of the plurality of devices.

15. A monitoring system according to claim 7, wherein the monitoring engine is configured to transmit a clock signal to each of the plurality of devices.

16. A monitoring system according to claim 15, wherein the clock signal includes the status load signal.

17. A monitoring system according to claim 1, wherein the monitoring engine has a history counter configured to maintain historical status information.

18. A monitoring system according to claim 9, wherein the load control signal is a function of the status information received by the monitoring engine.

19. A method for monitoring a plurality of devices coupled in a serial chain and each having a shift register and a status register, comprising:
   sending a status load signal to the plurality of devices such that status information is loaded into the shift register of each of the plurality of devices from their respective status registers; and
   receiving the status information from each of the plurality of shift registers.

20. A method for monitoring according to claim 19, wherein at least one of the plurality of devices is a power device.

21. A method for monitoring according to claim 19, wherein the status information includes a current or voltage level.

22. A method for monitoring according to claim 19, wherein the status information includes a thermal indicator.

23. A method for monitoring according to claim 19, wherein the status information includes a fault count.

24. A method for monitoring according to claim 19, wherein the status information includes a persistence count.

25. A method for monitoring according to claim 19, wherein the plurality of devices each have a control register, the method further comprising sending control information to each of the shift registers and transmitting a load control signal to the plurality of devices to cause the loading of the control information into each of the control registers.

26. A method for monitoring according to claim 25, wherein the control information includes bounding information.

27. A method for monitoring according to claim 25, further comprising sending a clock signal having the load control signal to each of the plurality of devices.

28. A method for monitoring according to claim 25, wherein the control information is a function of the updated status information.

29. A method for monitoring according to claim 19, further comprising transmitting a clock signal to each of the plurality of devices.

30. A method for monitoring according to claim 29, wherein the clock signal includes the status load signal.

31. A method for monitoring according to claim 19, further comprising maintaining a history counter providing historical status information.

32. A method according to claim 19, wherein at least one of the plurality of devices includes a plurality of status registers, the method further comprising:
   selecting at least one of the plurality of status registers such that status information is loaded from the selected status register into the shift register responsive to the status load signal.

33. A method according to claim 25, wherein at least one of the plurality of devices includes a plurality of control registers, the method further comprising:

selecting at least one of the plurality of control registers such that control information is loaded into the selected control register responsive to the load control signal.

34. A method according to claim 33, wherein the act of selecting includes sending a control register identifier with the control information.

* * * * *